Figure 1:
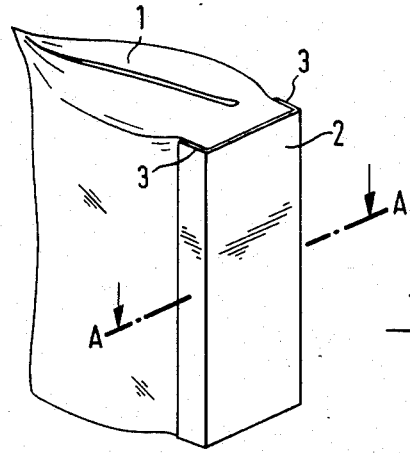

United States Patent [19]

Gautier et al.

[11] Patent Number: 4,633,649
[45] Date of Patent: Jan. 6, 1987

[54] PROCESS AND DEVICE FOR POSITIONING HANDLES OR RIGIDIFYING ELEMENTS ON A TUBULAR SLEEVE

[76] Inventors: Paoul Louis A. Gautier, Belmont sur Vair; Michel Cazes, Rue Jean Bouin, both of F-88800 Vittel, France

[21] Appl. No.: 758,648
[22] PCT Filed: Nov. 13, 1984
[86] PCT No.: PCT/FR84/00259
  § 371 Date: Sep. 16, 1985
  § 102(e) Date: Sep. 16, 1985
[87] PCT Pub. No.: WO85/02160
  PCT Pub. Date: May 23, 1985

[30] Foreign Application Priority Data

Nov. 15, 1983 [FR] France ............... 83 18257
Jun. 25, 1984 [FR] France ............... 84 10092

[51] Int. Cl.⁴ .................................. B65B 61/14
[52] U.S. Cl. ........................... 53/413; 53/415; 53/450; 383/7; 383/119
[58] Field of Search ........... 53/410, 413, 415, 450; 383/7, 119, 25

[56] References Cited

U.S. PATENT DOCUMENTS

| | | | |
|---|---|---|---|
| 2,103,386 | 12/1937 | Salfisberg | 53/415 |
| 2,259,866 | 10/1941 | Stokes | 53/415 |
| 2,260,064 | 10/1941 | Stokes | 53/415 |
| 2,815,898 | 12/1957 | Thompson | 383/119 |
| 3,894,381 | 7/1975 | Christine | 53/410 X |
| 4,055,032 | 10/1977 | Hammond | 53/410 |

*Primary Examiner*—John Sipos
*Attorney, Agent, or Firm*—Prutzman, Kalb, Chilton & Alix

[57] ABSTRACT

A method for positioning handles on a sachet-type container made from a flexible synthetic material comprises attaching handles to a sleeve of synthetic material while the sleeve is on the mandrel. The sleeves are cut and flap-like corner portions are folded over onto the handles. The handles may be fed from a magazine.

12 Claims, 15 Drawing Figures

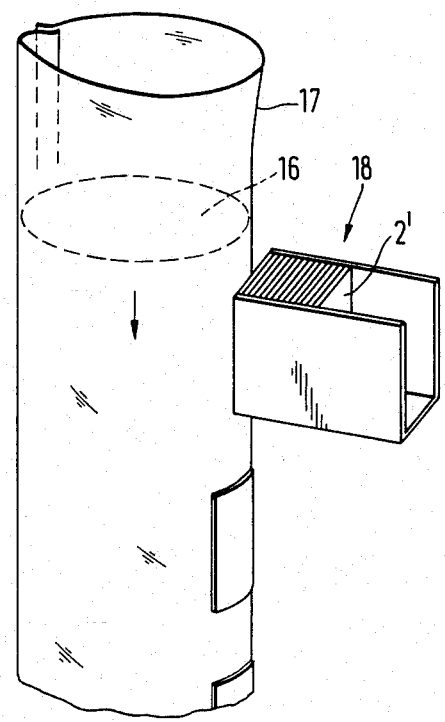
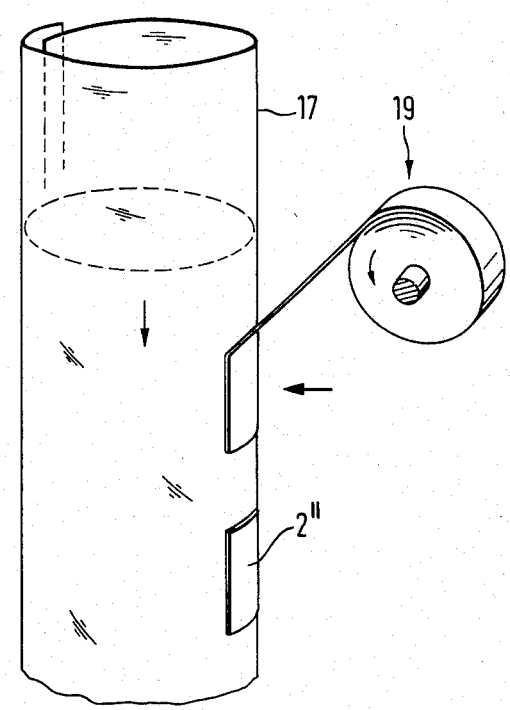
Fig. 5  Fig. 6
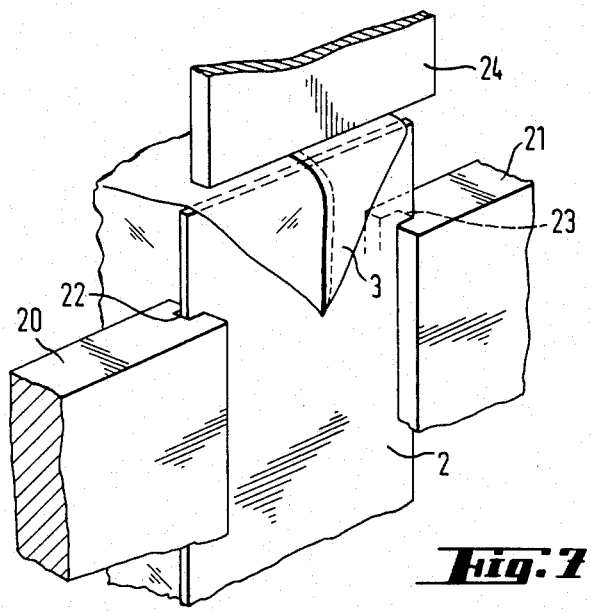
Fig. 7

PROCESS AND DEVICE FOR POSITIONING HANDLES OR RIGIDIFYING ELEMENTS ON A TUBULAR SLEEVE

The present invention relates to a process for the manufacture of a sachet, made from a flexible synthetic material and containing a liquid, the sachet being provided with means of holding and regidifying, and being obtained from a pillow pack filled with liquid, the said pillow pack itself being produced continuously from a sleeve of synthetic film wound on a vertical mandrel. The invention further relates to a device for producing such a sachet as well as to the sachets obtained in accordance with this process.

Sachets obtained by processes with essentially vertical travel are well known per se. They amount, for the greater part, to producing, at a given instant of the process, a simple pillow pack which is sealed by three side welds and is filled with liquid. The problem which arises is to give this pillow pack a shape and stability such as to permit the pillow pack to be gripped and used, in particular for pouring out its contents.

The devices proposed hitherto, for the greater part, resort to specific and complex welds and cut-outs of the lower part of the intermediate pillow pack intended to be converted to a sachet.

The need thus arises for sachets obtained by a vertical-travel process, which sachets can be provided with efficient and inexpensive means of gripping and rigidification.

According to the invention, this result is achieved by a process for the production of a sachet, made from a flexible synthetic material and containing a liquid, the sachet being provided with means of holding and rigidifying, and being obtained from a pillow pack filled with liquid, the said pillow pack itself being produced continuously from a sleeve of synthetic film wound on a vertical mandrel, characterised in that the said means of gripping and rigidification essentially consists of a rigid or semi-rigid handle attached to the sleeve while the latter is on the mandrel of the forming machine.

According to an advantageous embodiment of the invention, the handle can be in the form of a rigid strip having a variety of possible cross-sections. The strip is attached continuously to the sleeve while the latter is on the forming mandrel of a vertical machine. Machines of this type are described, for example, in French Pat. No. 2,071,075. They will not be described in more detail here.

The process of the invention can be operated either starting from a magazine for preparing and storing ready-to-use handles or by employing a device which is integrated with the packaging machine and feeds the handles from a reel, the handles being successively formed and cut off. These various processes will be explained below.

According to another embodiment of the process of the invention, the handles or rigidifying elements are taken by suction from a feed magazine by means of a rotating arm comprising a suction cup and means of welding, and the said rotating arm, after rotation, applies the said handle or rigidifying element to the tubular sleeve located on the mandrel, the handle or rigidifying element being attached to the said sleeve by welding means.

The invention also relates to a device for carrying out this process. According to an advantageous embodiment, it is provided that each handle or rigidifying element, made for example from cardboard, is combined, at the feed magazine, with a sheet of synthetic material perforated with one or more holes, allowing the rotating arm to apply suction to, and pick up, the handle and its associated sheet simultaneously, the handle subsequently being fixed to the sleeve by means of the said sheet.

It does not go outside the scope of this embodiment to provide that the handle or rigidifying element is ab initio made directly weldable onto the sleeve.

Figure 2:
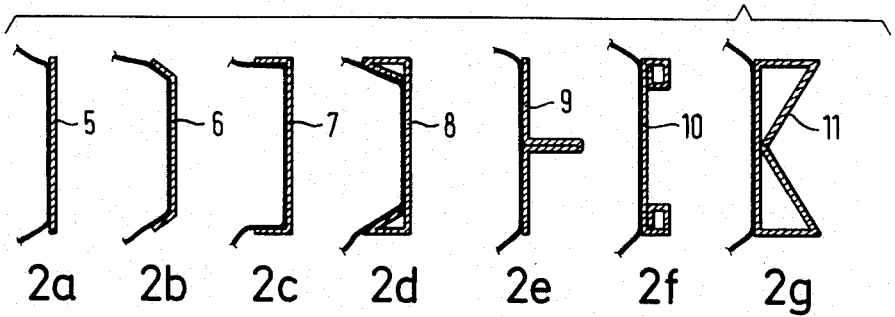
Figure 3:
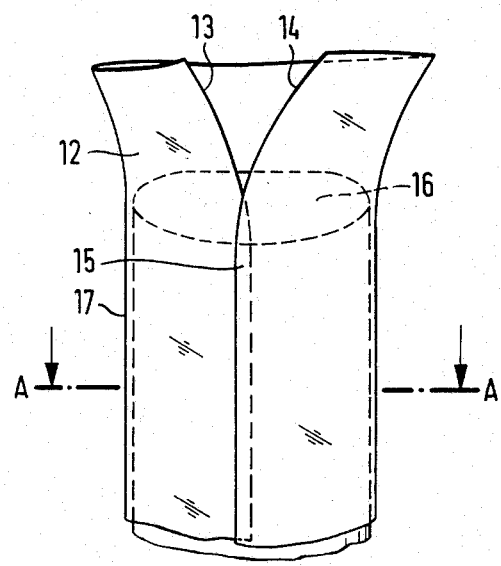
Figure 4:
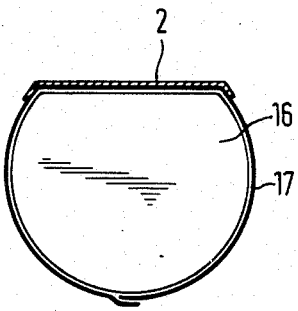
Figure 8A:
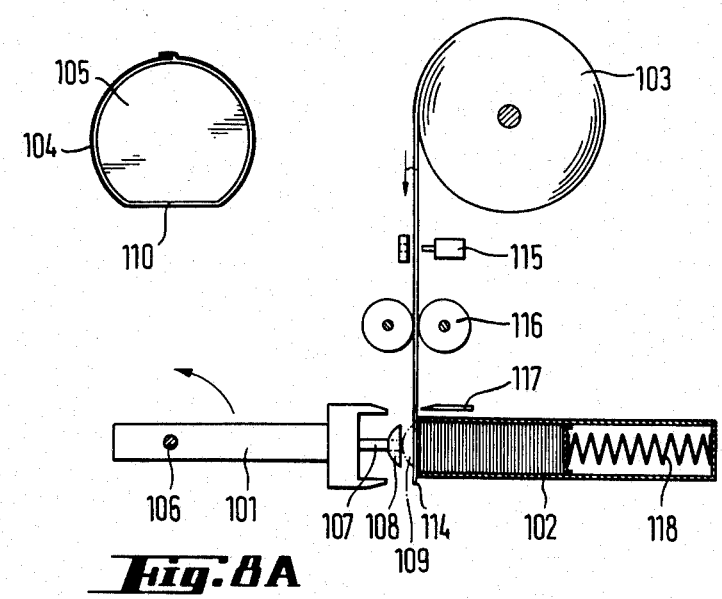
Figure 8B:
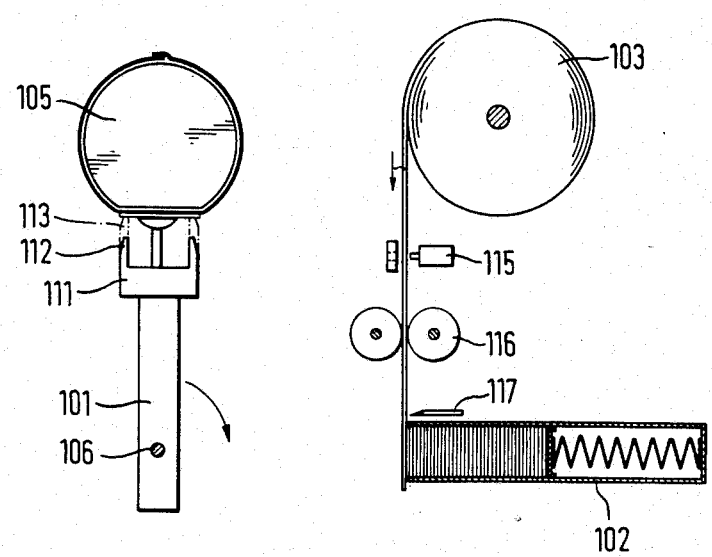

The invention will be better understood with the help of the description which follows and which is given with reference to the attached drawings, given by way of a non-limiting example, in which drawings:

FIG. 1 is a perspective view of a pillow pack equipped with a handle and conforming to the invention, FIGS. 2a, 2b, 2c, 2d, 2e, 2f and 2g are sections along A—A of FIG. 1, according to various embodiments, FIG. 3 schematically indicates the vertical shaping process of a sleeve, FIG. 4 shows a cross-section along B—B at the mandrel of the shaping machine and explains the principle of the process of the invention, FIG. 5 is a schematic representation of a first embodiment of the process of the invention, which starts from a magazine containing the prepared handles, FIG. 6 is a schematic representation of a second embodiment of the process of the invention, which starts from a reel, FIG. 7 illustrates a subsequent process stage in which the handle is reinforced, FIG. 8A is a schematic plan view of the stage at which a handle or rigidifying element is picked up by the rotating arm from the feed magazine, according to a third embodiment of the invention and FIG. 8B is a schematic plan view of the stage at which the handle or rigidifying element is placed on the tubular sleeve by the rotating arm.

Reference will first be made to FIG. 1, which shows the desired pillow pack (1) provided with handles (2). It can subsequently be used, if required, in this form, as a sachet, or can be subjected to further treatments, in particular in order suitably to shape the upper corner (3) as well as the lower corner (4) opposite the handle (2).

The pillow pack (1) is made from a flexible synthetic material known per se.

The handle (2) can, throughout the text which follows, be of any desired composition, such as cardboard, plastic, etc., and of any desired structure, such as corrugated, solid, embossed, etc.

The handle (2) can have various cross-sections, namely flat (5), in FIG. 2a enveloping, with angles greater than 90° (6), in FIG. 2b enveloping, with right angles (7), in FIG. 2c, enveloping, with right angles having folded-back edges (8) in FIG. 2d with a central fold (9) in FIG. 2e, flat, with the ends folded back at right angles towards the outside (10), in FIG. 2f, or flat, with the ends folded back slopingly towards the outside (11), in FIG. 2g.

It will be understood that these cross-sections are given purely by way of example and without implying a limitation.

FIG. 3 indicates the process of producing a tubular sleeve intended to be filled with liquid and delivered as unit pillow packs.

A film (12) delivered continuously from a reel which is not shown passes over a so-called swan-neck structure which allows the two ends (13, 14) of the film to be brought together; these are subsequently welded along a continuous line (15), around a vertical mandrel (16) so as to form a sleeve (17).

According to the invention the handle (2) is applied continuously, at this stage, to the sleeve (17), while the latter is still on the mandrel (16) which serves as a support.

Advantageously, the mandrel has a specific cross-section adapted to each handle (2), the handle either carrying a suitable glue on the face which points towards the sleeve (17) or being welded thereto.

According to the embodiment in FIG. 5, the handles (2) prepared beforehand are fed from a magazine (18) and are applied by pressure onto the sleeve (17), supported by the mandrel (16). The handle is presented by the magazine in a ready-to-use form, that is to say it has been cut, folded and formed.

According to the embodiment in FIG. 6, the handle (2″) is formed from a reel (19) by a device integrated into the packaging machine. The forming and cutting-off of individual handles are effected by processes known per se. The handle is placed in position as previously described. As a variant, the handle can be fed horizontally instead of travelling in the direction in which the sleeve (17) travels.

At this stage, regardless of which of the processes described is used, the configuration shown in FIG. 1 is obtained, with the various possible shapes of the handles.

In order to reinforce the handle further, the upper corner can be folded over after the pillow pack equipped with its handle has been filled and the upper zone has been welded, as illustrated in FIG. 7. Since the handle is a rigid element, it thus in effect becomes possible to use it as a (reference) guide element and support element. To do so, the handle (2) is held in jaws (20, 21) equipped with grooves (22, 23). Thereafter a plunger (24) travelling vertically presses the foldedover corner (3) against the handle, the said corner having beforehand been provided with a spot of glue. In the case of compatible materials, the corner (3) and the handle (2) can be welded together.

Reference will now be made to FIGS. 8A and 8B. The device used for carrying out this process essentially comprises:
  a rotating arm (101) and
  a feed magazine (102).

The desired aim is to affix a handle or rigidifying element (hereafter simply referred to as "handle") onto a tubular sleeve (104) which has been formed around a vertical mandrel (105).

According to the main characteristic of this embodiment, the arm (101) mounted to rotate about an axis (106), comprises a suction means, for example a suction cup (107), for picking up a handle from the magazine (102). The suction cup is mounted so as to be translationally movable along the longitudinal axis of the arm (101). Thus, when the rotating arm presents itself in alignment in front of the magazine (102), the suction cup is in the retracted position (108) relative to the arm. For picking up a handle, the suction cup advances into position (109) and is applied against the handle presenting itself. When suction is applied, the suction cup takes the handle with it as it retracts again into position (108). The rotating arm (101) then turns through a predetermined angle so as to present the handle in front of the mandrel (105).

The handle is then applied to the film (104) at a flat part (110) of the mandrel, by the suction cup advancing out of the rotating arm into a position similar to the abovementioned position (109).

The handle is then fixed to the sleeve by welding means (111) also carried by the arm (101) and translationally movable along the longitudinal axis of the arm, in the same manner as the suction cup.

The welding means thus passes from a retracted position (112) into a welding position (113) which allows the handle to be attached to the sleeve. The welding means and the suction cup are then retracted, the suction is discontinued and the arm presents itself in front of the magazine (102) for a fresh operation.

According to an advantageous embodiment, each handle contained in the magazine is associated with a sheet of synthetic material (114), the latter being located between the suction cup and the handle just before the latter is picked up by the suction cup.

The handle can nevertheless be picked up by the suction cup as a result of providing one or more holes, produced beforehand by a punch (115), in the sheet.

The sheets are produced from a reel of film (103), using a stepping drive (116) for the film.

The sheets are cut off by a cutting means (117) located just upstream of the magazine. The area of the sheet (114) is arranged to be slightly greater than that of the handle, so that it overlaps the edges of the latter and can be welded onto the film (104).

The sheet can consist of any material which for welding purposes is compatible with the material of the film (104). Since the sheet is not in contact with the liquid contained in the final sachet, it can be made of a less high-grade material than the actual sachet.

The handles can be made of any material, for example of cardboard, and also serve as labels which identify the sachet and its content. In the magazine (102), they are fed forward successively by a conventional spring system (118).

Of course, the whole apparatus is indexed so that the sleeve moves downward on the mandrel while a handle is picked up by the rotating arm, and so that the plastic sheet moves forward while the handle is being positioned on the tubular sleeve.

The operation of cutting off the sheet (114) associated with the handle is carried out conjointly with the latter being picked up by the suction cup (107).

All these components can employ pneumatic and mechanical systems which are perfectly well known to those skilled in the art and will hence not be described in more detail here.

I claim:
1. In a process for the production of a sachet made from a flexible synthetic material for holding a liquid of a type wherein the sachet is formed from a pillow pack produced in continuous fashion from a sleeve of synthetic film wound on a mandrel with the sleeve being cut to form sleeve segments and the ends of the segments being sealed to form a pillow pack having flap-like corner portions, the improvement comprising:
  attaching a handle to a portion of the sleeve while the sleeve portion is on the mandrel; and subsequently folding the flap-like corner portion over onto the handle.

2. The improved process of claim 1 further comprising:
arranging a multiplicity of the handles in ready prepared form in a magazine; and
sequentially feeding the handles from the magazine for affixation to the sleeve.

3. The improved process of claim 1 further comprising:
providing a reel having a strip of handle material; and
feeding the material from said reel for affixation to the sleeve.

4. The process of claim 2 further comprising the steps:
sequentially grasping the handles for removal from the magazine by suction means;
sequentially rotating the handles into position against the sleeve; and
sequentially welding the handles to the sleeve.

5. The process of claim 1 further comprising the step of:
sequentially interposing a sheet of synthetic material between the sleeve and the handles.

6. The process of claim 5 further comprising the steps of:
moving the sleeve relative to the mandrel while a handle is being fed for affixation to the sleeve; and
grasping a succeeding handle at the same time a preceeding handle is being positioned on the sleeve.

7. The process of claim 6 further comprising the step of:
simultaneously cutting a continuous strip of material for interposing between the sleeve and handle and grasping an associated handle for subsequent attachment to the sleeve.

8. A device for the continuous production of a sachet made from a flexible synthetic material for holding a liquid comprising:
package forming means including a mandrel for continuously forming a sleeve of synthetic film on said mandrel;
feeding means for sequentially supplying a plurality of handles to said package forming means;
affixation means for sequentially affixing a handle to a portion of the sleeve while the sleeve portion is on the mandrel;
pillow pack means for cutting said sleeve into sleeve sections and for sealing the ends of said sections to form pillow packs having flap-like corner portions; and
folding means for folding a corner portion of the formed pillow pack over onto an affixed handle.

9. The device of claim 8 wherein the sleeve travels in a first direction relative to the mandrel, the folding means comprises a plunger which travels in the first direction and the feeding means further comprises a pair of jaws having grooves for receiving a handle.

10. The device of claim 8 further comprising a magazine for holding a multiplicity of handles to be affixed to said sleeve and wherein the feeding means further comprises an arm which is rotatable about an axis, said arm having a suction cup for sequentially grasping a handle from said magazine and a welding means for welding said handle to said sleeve, said suction cup and said welding means being translationally movable on a longitudinal axis of said arm longitudinal axis of said arm.

11. The device of claim 10 further comprising a sheet means comprising a reel for supplying and advancing a continuous strip of material and a cutting means for cutting the strip into sheets so that a sheet is interposed between the magazine and the feeding means.

12. The device of claim 8 wherein the mandrel has a generally planar surface portion which is complementary with a corresponding surface portion of an affixed handle.

* * * * *